United States Patent
Taratine et al.

(10) Patent No.: US 10,133,872 B2
(45) Date of Patent: Nov. 20, 2018

(54) ENABLING ACCESS TO DATA

(71) Applicant: VISA EUROPE LIMITED, London (GB)

(72) Inventors: Boris Taratine, London (GB); Malcolm Lewis, London (GB)

(73) Assignee: Visa Europe Limited, London (GB)

( * ) Notice: Subject to any disclaimer, the term of this patent is extended or adjusted under 35 U.S.C. 154(b) by 250 days.

(21) Appl. No.: 15/047,496

(22) Filed: Feb. 18, 2016

(65) Prior Publication Data
US 2016/0171224 A1 Jun. 16, 2016

Related U.S. Application Data

(63) Continuation of application No. PCT/GB2014/052545, filed on Aug. 19, 2014.

(30) Foreign Application Priority Data

Aug. 19, 2013 (GB) .................................. 1314782.2

(51) Int. Cl.
*G06F 17/30* (2006.01)
*G06F 21/60* (2013.01)
(Continued)

(52) U.S. Cl.
CPC ........ *G06F 21/602* (2013.01); *G06F 17/3033* (2013.01); *G06F 17/30557* (2013.01);
(Continued)

(58) Field of Classification Search
CPC ......... G06F 17/30286; G06F 17/30312; G06F 17/30321; G06F 17/3033; G06F 17/30557;
(Continued)

(56) References Cited

U.S. PATENT DOCUMENTS 6,311,216 B1 * 10/2001 Smith ............... G06F 17/30902
707/E17.12
6,807,632 B1 * 10/2004 Carpentier ............ H04L 67/108
380/28
(Continued)

FOREIGN PATENT DOCUMENTS

CN 101150404 A 3/2008
WO 9938092 A1 7/1999
(Continued)

OTHER PUBLICATIONS

UKIPO Search Report dated Feb. 18, 2014 for GB Application No. GB1314782.2.
(Continued)

*Primary Examiner* — Khang Do
(74) *Attorney, Agent, or Firm* — Kilpatrick Townsend & Stockton LLP (57) ABSTRACT

Methods, systems, apparatus and computer programs for enabling access to data by a requesting party. A plurality of sets of data are generated. A one one-way function is then used to generate a plurality of keys each associated with a respective one of the plurality of sets. Information associated with the data in a given set is used as an input to the one-way function when generating the key for that set. The keys are distributed to requesting parties. Subsequently, a requesting party may make a data access request using the received key. Upon receipt of a key, access may be enabled to the data. The requesting party may then generate validation data from information associated with at least a part of the received data and validating the received data by comparing the validation data to data derived from the received key.

20 Claims, 6 Drawing Sheets

(51) Int. Cl.
*H04L 9/08* (2006.01)
*H04L 9/32* (2006.01)

(52) U.S. Cl.
CPC .......... *H04L 9/0894* (2013.01); *H04L 9/3236* (2013.01); *H04L 9/3242* (2013.01); *H04L 2209/24* (2013.01)

(58) Field of Classification Search
CPC ... G06F 21/602; H04L 9/0894; H04L 9/3236; H04L 2209/24
See application file for complete search history.

(56) References Cited

U.S. PATENT DOCUMENTS

| | | | | |
|---|---|---|---|---|
| 8,074,289 | B1* | 12/2011 | Carpentier | H04L 63/065 705/51 |
| 2003/0002668 | A1 | 1/2003 | Graunke et al. | |
| 2008/0075288 | A1 | 3/2008 | Kamijoh et al. | |
| 2009/0157740 | A1 | 6/2009 | Barley et al. | |
| 2010/0179831 | A1 | 7/2010 | Brown et al. | |
| 2010/0235629 | A1* | 9/2010 | Tuda | G06Q 20/341 713/159 |
| 2013/0198475 | A1* | 8/2013 | Serlet | G06F 12/0269 711/164 |
| 2014/0052749 | A1* | 2/2014 | Rissanen | G06F 21/6227 707/759 |
| 2015/0295717 | A1* | 10/2015 | Brittan | G06F 21/36 713/168 |

FOREIGN PATENT DOCUMENTS

| | | |
|---|---|---|
| WO | 9938093 A1 | 7/1999 |
| WO | 2009129535 A | 10/2009 |
| WO | 2009142834 A | 11/2009 |
| WO | 2015025156 A1 | 2/2015 |

OTHER PUBLICATIONS

UKIPO Further Search Report dated May 28, 2014 for GB Application No. GB1314782.2.

International Search Report and Written Opinion dated Dec. 11, 2014 for PCT Application No. PCT/GB2014/052545.

First Office Action, dated Jul. 4, 2018, in Chinese Patent Application No. 2014800573497, 8 pages.

* cited by examiner

ENABLING ACCESS TO DATA

CROSS-REFERENCE TO RELATED APPLICATIONS

This application is a continuation of International Application No. PCT/GB2014/052545, filed Aug. 19, 2014, which claims the benefit of GB Application No. 1314782.2, filed Aug. 19, 2013. Each of the above-referenced patent applications is incorporated by reference in its entirety.

BACKGROUND OF THE INVENTION

Field of the Invention

The present invention relates to apparatus, systems and methods for enabling access to data, and in particular to enabling access to data by a plurality of requesting parties.

Description of the Related Technology

In many communications systems it is desirable to control access to data. In particular it is desirable to have a system in which different requesting parties are allowed to access certain data portions within a given block of data while being prevented from accessing other data portions. Moreover, it is desirable to allow different parties access to the same data portions of data, while not, for example, giving two parties access to all the same data portions; that is, parties are allowed overlapping, but not necessarily identical, access.

One example of a system to provide this is described in US 2005/0180573. In this example a block of data is divided into portions. Each portion of the data is then encrypted using a different portion specific key. Requesting parties are then provided with a party specific key, which can be used to derive or decrypt portion specific keys. The party specific keys are arranged such that a given party is only able to acquire portion specific keys corresponding to portions of the data to which the party is allowed access. This enables a requesting party to decrypt, and thus access, the portions of the data to which that party is allowed access.

However, this system comes with a number of drawbacks. For example, a lost key, or removal of access rights of a given requesting party, means that all portions of the data to which a given party was previously allowed access have to be re-encrypted. In addition, this system requires any computerized equipment used by the parties to be capable of decrypting the data adding overheads to the overall system.

Consequently, there is a need for an improved system for enabling access to data.

SUMMARY

In accordance with at least one embodiment, methods, devices, systems and software are provided for supporting or implementing functionality to transfer data.

This is achieved by a combination of features recited in each independent claim. Accordingly, dependent claims prescribe further detailed implementations of various embodiments.

According to a first aspect of the invention there is provided a method of enabling access to data by a requesting party, the method comprising: generating a plurality of sets of data; using a one-way function to generate a plurality of keys each associated with a respective one of the plurality of sets, wherein information associated with a said set of data is used as an input to the one-way function when generating a key associated with the set; arranging for the keys to be available for distribution to one or more requesting parties; receiving a data access request comprising a key from a said requesting party; and enabling access, by the requesting party, to data in a said set, based on the received key.

By generating the sets, and associating the set with the keys, embodiments are able to efficiently control access to the data. Should a key be compromised—that is the key becomes known to a party which is not authorized to access the data—the only changes which need to be made are to the association between the keys and the sets. For example, a new key may be generated and the compromised key may be revoked. This is more efficient than the encryption system described in the background section as no re-encryption is required.

In addition, as a consequence of using a one-way function, a third party will be unable to create valid keys to use to access the data, and thus the only source of a valid key is via distribution from the key generator. This provides improved security to the system as the distribution of the keys can be controlled and used to restrict access to the data and as the key itself provides a means to authenticate the requesting parties and thus control access to the data. This can be compared to a system where a simple pointer, such as a URL, is provided to enable access to remote data.

By using the data itself to generate the keys, the keys are able to perform two functions. First, they enable access to the data, and secondly the keys enable a receiving party to validate the retrieved data using the key. In particular, the keys can be used to detect changes (whether accidental or from an attack) to the data between the keys being generated and the data being accessed. Since the keys (once distributed) will be held by a requesting party separately from the data, this makes it harder to modify the data without being detected.

The information associated with a set of data may identify the content of the data. Alternatively, the information associated with a set of data may comprise at least a part of the content of the data.

The method may comprise using one or more salt values as inputs to the one-way function. Furthermore, the method may comprise storing a salt value used to generate a given key as data in a set accessible using the given key.

Salt values enable, for example, different keys to be generated for the same data, thus enabling different keys to be distributed to the requesting parties. While the salt values may be sent to the requesting parties with the keys, or made available for retrieval separately, in embodiment the salt values may stored with the data in a set and distributed with the data, thus enabling the requesting party to validate the data upon receipt.

The one-way function may comprise one or more of: a hash function; a cryptographic signing function; a random number generator; and a pseudo-random number generator. In embodiments, the keys may have high entropy.

Access may be enabled for a limited number of requests comprising a given key. The method may therefore comprise generating a plurality of keys associated with a given set. The method may also comprise generating a second key associated with a given set in response to receiving a request comprising a first key associated with a given set.

This reduces the effectiveness of man-in-the-middle attacks where an attacking party intercepts a request for data, and thus acquires a valid key. Once used, the key will cease to be valid, so any attempt by the attacking party to gain access to the data using the key will be unsuccessful.

The method may comprise associating a plurality of keys with a said set; arranging for the plurality of keys to be available for distribution; enabling access to the said set of data in dependence on a predetermined criterion being satisfied, said predetermined criterion being dependent on receipt of two or more of the plurality of keys.

In some embodiments, the method may comprise generating first, second and third keys, the third key being related to a combination of at least the first and second keys; associating the third key with a particular said set; arranging for the first and second keys to be available for distribution; and granting access to the particular said set in dependence on receipt of either a combination of the first and second keys or the third key.

Usefully, two keys may be required to access certain data. This may in turn be used to ensure that only when two requesting parties work together will access be granted.

The method may comprise associating the first and second keys with respective further sets. The method may further comprise storing the keys and information identifying the sets in a lookup table; and may also comprise identifying data in a set associated with the received key in the lookup table.

In embodiments, the method may comprise transmitting the keys using a first protocol whereby to make the keys available for distribution, and wherein at least a part of the data in a set is suitable for communication via a second, different, protocol. As such, the method may further comprise enabling access to the data using a second protocol.

In some systems, established protocols may not be able to handle certain data. However, in embodiments, the established protocol can be used to distribute the keys, and the data in the sets may be subsequently retrieved using an alternative protocol. Thus the system, and in particular entities using the established protocol need not be updated, and yet any updated entity is able to access additional data, i.e. the data in the sets.

According to a second aspect of the invention there is provided a method of accessing and validating data, the method comprising: receiving a key; making a data access request using the received key; receiving data in response to the request; using a one-way function to generate validation data from information associated with the received data; and validating the received data by comparing the validation data to data derived from received key.

According to a third aspect of the invention there is provided apparatus for enabling access to data by a requesting party, the apparatus configured to: generate a plurality of sets of data; use a one-way function to generate a plurality of keys each associated with a respective one of the plurality of sets, wherein information associated with a said set of data is used as an input to the one-way function when generating a key associated with the set; arrange for the keys to be available for distribution to one or more requesting parties; receive a data access request comprising a key from a said requesting party; and enable access, by the requesting party, to data in a said set, based on the received key.

According to a fourth aspect of the invention there is provided apparatus for accessing and validating data, the apparatus configured to: receive a key; make a data access request using the received key; receive data in response to the request; use a one-way function to generate validation data from information associated with the received data; and validate the received data by comparing the validation data to data derived from received key.

According to a fifth aspect of the invention there is provided a computer program arranged to perform a method of enabling access to data by a requesting party, the method comprising: generating a plurality of sets of data; using a one-way function to generate a plurality of keys each associated with a respective one of the plurality of sets, wherein information associated with a said set of data is used as an input to the one-way function when generating a key associated with the set; arranging for the keys to be available for distribution to one or more requesting parties; receiving a data access request comprising a key from a said requesting party; and enabling access, by the requesting party, to data in a said set, based on the received key.

According to a sixth aspect of the invention there is provided a computer program arranged to perform a method of accessing and validating data, the method comprising: receiving a key; making a data access request using the received key; receiving data in response to the request; using a one-way function to generate validation data from information associated with the received data; and validating the received data by comparing the validation data to data derived from received key.

Further features and advantages will become apparent from the following description of preferred embodiments, given by way of example only, which is made with reference to the accompanying drawings.

BRIEF DESCRIPTION OF THE DRAWINGS

Systems, apparatus and methods will now be described as embodiments, by way of example only, with reference to the accompanying figures in which.

Some parts, components and/or steps of the embodiments appear in more than one Figure; for the sake of clarity the same reference numeral will be used to refer to the same part, component or step in all of the Figures.

DETAILED DESCRIPTION OF CERTAIN INVENTIVE EMBODIMENTS

Figure 1:
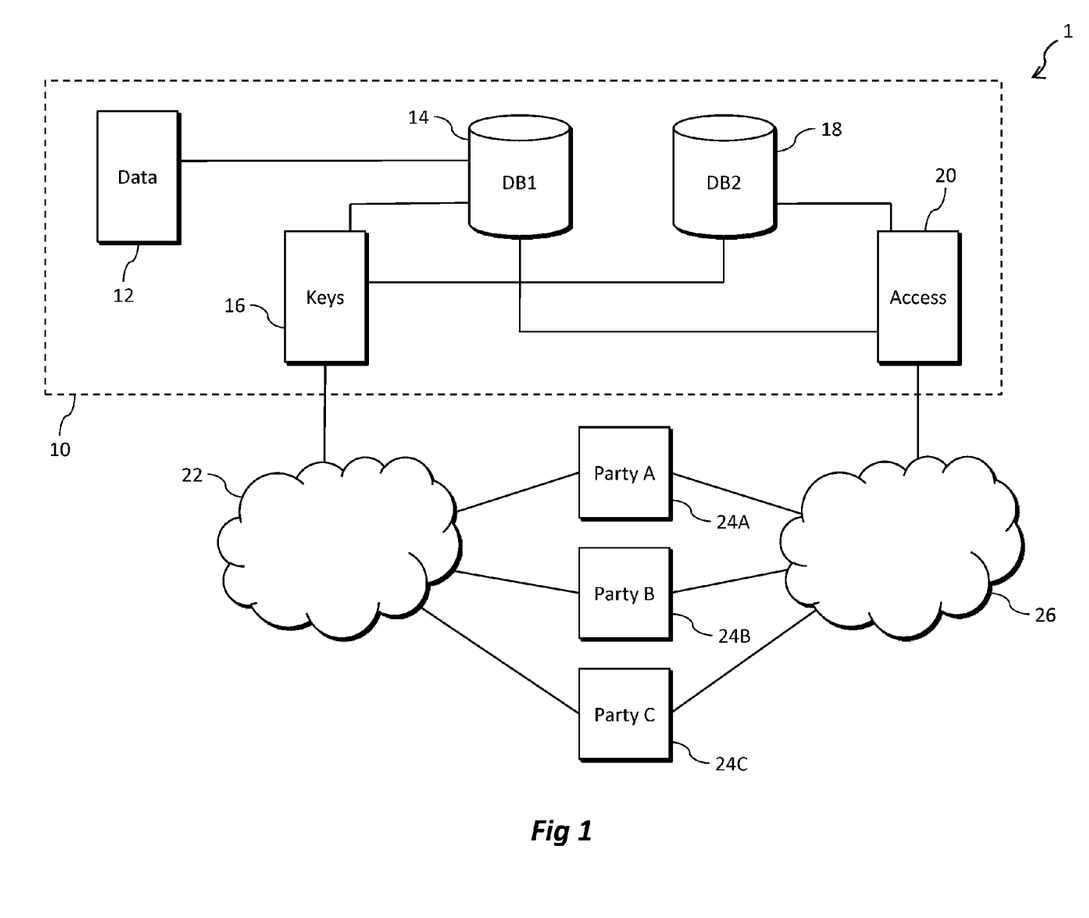
FIG. 1 shows a schematic diagram of a communications system in which embodiments of the invention may be practiced.

FIG. 1 shows a communications system 1 in which a number of requesting parties may access data stored in a data store, such as a database. Within the communications system, the data is stored within, and access to the data is controlled by, an access system 10.

The access system 10 comprises a number of nodes or elements 12, 14, 16, 18 and 20. These include a data source 12, which receives or generates data to be stored and subsequently accessed. The data source 12 is connected to a first database 14. A key generator 16 is connected to the first database 14, and is additionally connected to a second database 18. An access controller 20 is connected to the first and second databases 14 and 18.

The key generator 16 is connected to a number of requesting parties 24A, 24B and 24C via a first network 22. The access controller 20 is also connected to the requesting parties 24A, 24B and 24C, for example via a second network 26.

The access system 10 may be a single device. Accordingly the nodes 12, 14, 16, 18 and 20 within the access system may be combined, at least in part—for example a single database device may be used to provide the storage of both databases 14 and 18 described above. However this is not a requirement, and the access system 10 may be distributed, for example by being in the cloud—as such some or all of the nodes 12, 14, 16, 18 and 20 may be interconnected network nodes.

The requesting parties 24A, 24B and 24C may be remote from the access system 10; accordingly the networks 22 and 26 may be local networks, the internet, or proprietary communications networks. While the networks 22 and 26 have been described separately—the reason for this will be expanded on below—this is not a requirement and the networks 22 and 26 may form a single network.

The operation of the communications system 1 described above in FIG. 1 will now be described with reference to FIGS. 2 to 5. In these Figures, steps which are the same, or at least analogous, will be provided with the same reference numerals. It is assumed that, preceding the steps shown in FIGS. 2 to 5, appropriate data has been generated at, or received by, the data source 12. This data may take any number of forms, for example being documents, transaction data, media such as audio or video and/or metadata. The data may be received in data portions, for example individual files, media sections or fields and records in a structured or tabulated form of the data. Alternatively or additionally, the data may be separated into suitable data portions by the data source 12. The data portions will be provided with references P1 to P9 in the examples described below.

Figure 2:
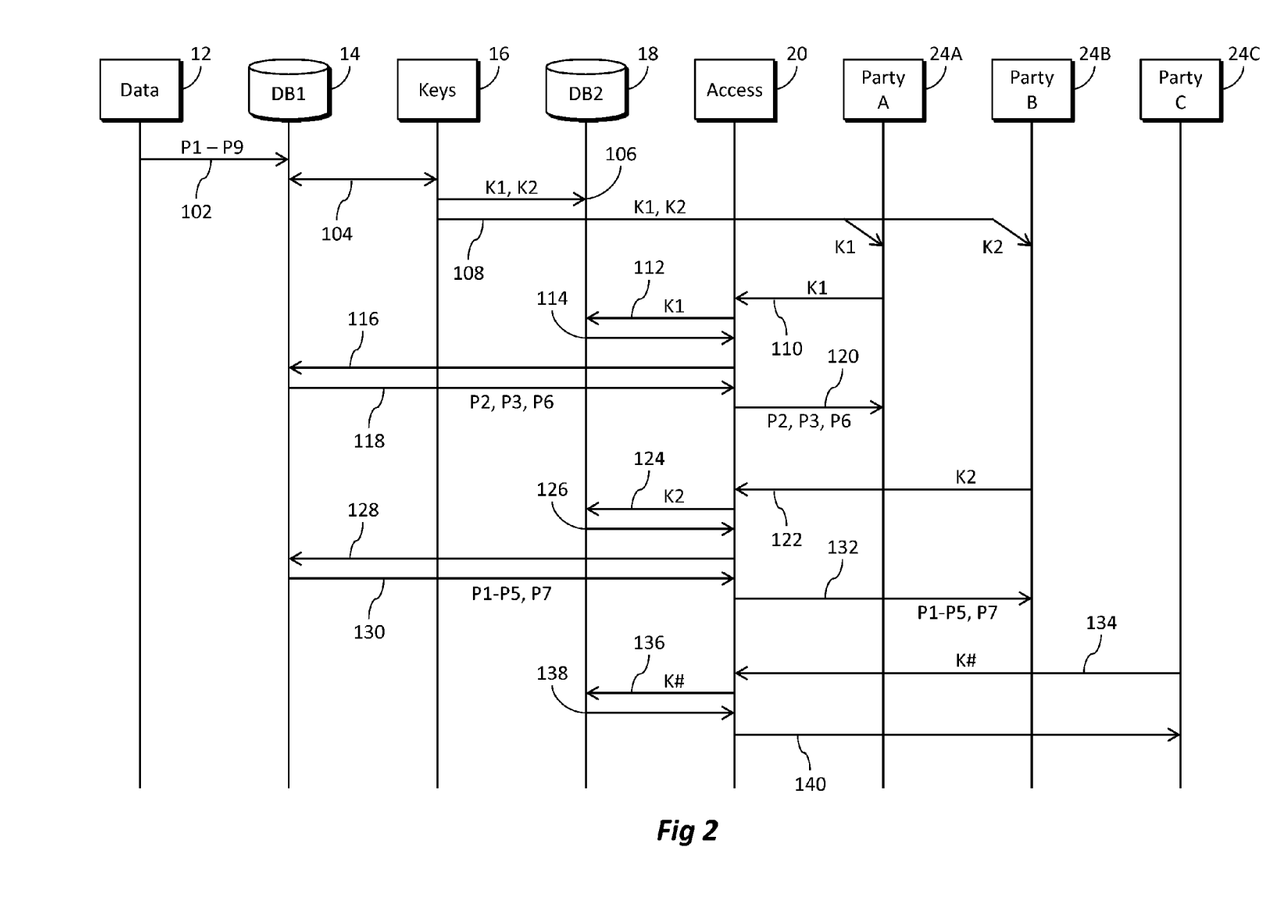
FIG. 2 illustrates a method according to an embodiment.

FIG. 2 shows the operation of the communications system 1 according to an embodiment. In step 102, the data source stores the data, in the portions P1 to P9, in the first database 14. Following that, in step 104, the key generator 16 communicates with the first database 14 and generates keys which are associated with the data. To do so, the key generator 16 generates a plurality of sets of the data portions. Each set identifies one or more of the data portions. The sets may be overlapping, at least in part, such that at least one data portion is identified in two or more sets. A table showing an exemplary distribution of the data into sets S1 and S2 is shown below.

| Set | Portions |
|---|---|
| S1 | P2, P3, P6 |
| S2 | P1-P5, P7 |

Here, the data portions P2 and P3 are identified in both sets S1 and S2. Data portions P8 and P9 are not identified in either of sets S1 and S2—a method of accessing these portions will be described below and with reference to FIG. 3.

To generate the sets, the key generator 16 may retrieve and process all or part of the portions P1 to P9 within the first database 14. A number of different methods by which this may be done will be described in detail below, but for conciseness will not be described here.

Having generated the plurality of sets, the key generator 16 then uses a one-way function to generate a plurality of keys. Each key is associated with a respective set, as is shown in the following table.

| Key | Set | Portions |
|---|---|---|
| K1 | S1 | P2, P3, P6 |
| K2 | S2 | P1-P5, P7 |

Subsequently, in step 106, the key generator 16 stores the keys and information associating the keys with the sets in the second database 18. This data may be stored in, for example, a lookup table.

The key generator 16 also arranges for the keys to be made available for distribution to one or more requesting parties, such as parties 24A and 24B. This is shown by step 108, where key K1 is made available to party 24A and key K2 to party 24B. In this example, party 24C does not receive a key, for reasons which will be described in more detail below. With reference back to FIG. 1, this distribution of keys may be performed via the first network 22.

The above describes the creation and distribution of keys. The following will describe how these keys may be used to enable access to data for the requesting parties.

In step 110, requesting party 24A transmits a data access request to the access controller 20. The data access request comprises the key K1, which had been received by the requesting party 24A in step 108. Having received a data access request the access controller 20 enables access, by the requesting party 24A, to the one or more data portions identified in the set associated with the received key, as will be described in detail with reference to steps 112 to 120.

In step 112, the access controller 20 uses the received key K1 to identify the set—in this case set S1—associated with the received key. This may be done by performing a lookup in the second database 18. Data identifying the set and/or the portions is received by the access controller 20 in step 114. The access controller 20 then, in step 116, retrieves the relevant portions—in this case portions P2, P3 and P6—from the first database 14. The portions are received by the access controller 20 in step 118 and sent to the requesting party 24A in step 120. Accordingly, access to the portions P2, P3 and P6 is enabled for the requesting party 24A. The requesting party 24A is only able to access the portions P2, P3 and P6; it is unable to access portions other than those associated with the key K1, i.e. portions P1, P4-P5 and P7-P9.

Similar access requests may be made by requesting party 24B as shown in FIG. 2 by steps 122 to 132. The difference in these steps is that the key received by the access controller 20 is key K2 (instead of key K1) and accordingly the portions returned to the requesting party 24B are the portions P1-P5 and P7, which are those identified within the set S2 associated with the key K2.

As noted above, requesting party 24C has not received a valid key; that is, no key was distributed to requesting party 24C in step 108. Requesting party 24C may therefore be assumed to be an attacking party, looking to gain access to the data portions, which is unauthorized. In this example, the requesting party 24C uses an invalid key K#. This invalid key K# may be, for example, a guessed or randomly generated key. The request comprising the invalid key is received by the access controller 20 in step 134 and used to perform a lookup in the second database 18 in step 136. However this lookup is unsuccessful as there are no sets or portions associated with the invalid key K#. The access controller 20 receives notification from the second database 18 that there are no associated portions in step 138, and consequently the access controller 20 denies requesting party 24C access to any of the data portions. This may include, in step 140, the access controller transmitting a rejection message to the requesting party 24C; however this is not required, and the access controller 20 may simply ignore the request made in step 134 without making a response.

The above describes a first method of enabling access to data according to embodiments. By generating the sets, and associating the set with the keys, embodiments are able to efficiently control access to overlapping sets of data portions—i.e. where two sets identify the same data portion. Moreover, should a key be compromised—that is the key is known to a party which is not authorized to access the data—the only changes which need to be made are to the association between the keys and the sets. For example, a new key may be generated and associated with the set which was previously associated with the compromised key. The compromised key may then be revoked, deleted or suppressed. This is more efficient than the encryption system described in the background section as no re-encryption is required.

One-way functions, used to generate the keys, are functions designed such that it is easy to compute the output using the input, but difficult to compute the input using the output. They are known in the art, and therefore will not be described in detail.

A one-way function (use to generate the keys) is a mathematical function that is significantly easier to compute in one direction (the forward direction) than in the opposite direction (the inverse direction). It might be possible, for example, to compute the function in the forward direction in seconds but to compute its inverse could take months or years, if at all possible. A one-way function will give an output that is un-predictable and equally distributed throughout the key space (the key space being the range of possible values which the key may take).

As a consequence of using a one-way function, a third party will be unable to create valid keys to use to access the data, and thus the only source of a valid key is via distribution from the key generator 16. This provides improved security to the system as the distribution of the keys can be controlled and used to restrict access to the data and as the key itself provides a means to authenticate the requesting parties and thus control access to the data. Moreover, should a key become compromised, only the set of data portions associated with that key are vulnerable to attack, rather than the data as a whole. This can also be contrasted to a system where a key merely represents requested data in the clear. Such a system can enable the distribution of data, but cannot prevent an attacking party from changing the form of the request and thereby accessing different data portions.

Examples of appropriate one-way functions include random or pseudorandom number generators, hash functions (the application of which will be described in more detail below), and so-called "trapdoor" one-way functions. A trapdoor one-way function is a one-way function for which the inverse direction is easy given a certain piece of information (the trapdoor), but difficult otherwise. For example, public-key cryptosystems may be based on trapdoor one-way functions. The public key gives information about the particular instance of the function; the private key gives information about the trapdoor. Whoever knows the trapdoor can compute the function easily in both directions, but anyone lacking the trapdoor can only perform the function easily in the forward direction. The forward direction is used for encryption and signature verification; the inverse direction is used for decryption and signature generation.

The use of keys provides a number of advantages over a system which uses, for example, a username/password based authentication system. Firstly, they keys enable a much greater granularity to access control—that is, a given requesting party may be provided with a plurality of keys, each enabling access to different portions of data. This can be illustrated by the following table. Here the data portions represent fields in a database structure. The database structure further separates the data into records, each comprising the portions (i.e. fields) P1 to P9. Sets of portions may be created for each record, as shown in the table below.

| Group ID | P1 | P2 | P3 | P4 | P5 | P6 | P7 | P8 | P9 |
|---|---|---|---|---|---|---|---|---|---|
| R1 | $P1_{R1}$ | $P2_{R1}$ | $P3_{R1}$ | $P4_{R1}$ | $P5_{R1}$ | $P6_{R1}$ | $P7_{R1}$ | $P8_{R1}$ | $P9_{R1}$ |
| R2 | $P1_{R2}$ | $P2_{R2}$ | $P3_{R2}$ | $P4_{R2}$ | $P5_{R2}$ | $P6_{R2}$ | $P7_{R2}$ | $P8_{R2}$ | $P9_{R2}$ |
| R3 | $P1_{R3}$ | $P2_{R3}$ | $P3_{R3}$ | $P4_{R3}$ | $P5_{R3}$ | $P6_{R3}$ | $P7_{R3}$ | $P8_{R3}$ | $P9_{R3}$ |

Therefore to continue the example above, a key K1R1 may be associated with a set S1R1, which is in turn associated with the portions P2R1, P3R1 and P6R1 in the first record R1. Similar keys K1R2, K1R3, K2R1 etc. may be created and distributed for other sets of portions in the various records. A requesting party may be provided with one, or a combination of, the keys, and thus be provided with a highly controllable access to the data.

A further advantage is that requesting parties may share keys with other parties, and thereby enable those other parties to access the data portions associated with the shared key. This can be done without having to provide credentials, for example, a full username and password to that other party, which can severely compromise the security of the system, as well as providing the other party with access to everything accessible via that username and password, rather than specific data.

The keys may have high entropy. That is the one-way function used to generate the key is designed to have a high entropy output. Entropy, in this context, is a measure of unpredictability or randomness in the generated keys and here relates to the number of equally possible keys which may exist. High entropy in turn means that the number of equally possible keys is sufficiently large to make a brute force attack to find a much smaller number of valid keys impractical.

For example, in a relatively low security system, the key may be a 16 bit word equating to approximately 65,000 possible keys, and approximately 50 (~$2^6$) keys may be distributed. This gives a ratio of possible to valid keys of approximately one thousand ($10^3$ or $2^{10}$) to 1. In a higher security system, the ratio may be one billion ($10^9$ or $2^{30}$) to 1 or higher. For example the key may be a 64-bit, 128-bit, 256-bit (or higher) number or word, equating to approximately $10^{19}$ ($2^{64}$), $10^{38}$ ($2^{128}$), or $10^{77}$ ($2^{256}$) possible keys. In such a system, even if approximately one billion ($10^9$ or $2^{30}$) keys are distributed, the ratio of possible to valid keys will be in excess of $10^{10}$ (~$2^{34}$) to 1, $10^{29}$ (~$2^{98}$) to 1 and $10^{68}$ (~$2^{226}$) to 1 respectively. It will be appreciated that factors, such as the algorithm used to generate the keys, the number of requests which can be processed, the number of keys which are to be distributed and the capabilities of the devices requesting the data for handling large keys will determine whether a given key length has high enough entropy for the design purposes of the system.

A further factor, which may be taken into account when determining whether a key length has high enough entropy, relates to the probability of there being a collision between two equal valid keys. This may happen if there are a large number of valid keys, even if the number of possible keys is large. The number of valid keys to be used may be estimated, and the key length selected to give an entropy which provides a risk of collision below an acceptable level.

Sufficient key entropy is one way of mitigating a known attack, referred to as the birthday problem. For example, in a system using 64-bit keys, if approximately 100 million (108 or 227) keys are valid then the probability of two valid keys being equal is less than 1%. However, if 100 times that number of keys, i.e. 10 billion keys (1010 or 233), are valid, the probability of a collision (i.e. there being two equal valid keys) is greater than 99%. Depending on the nature of the system, how the keys are generated and the relationship between the keys and the data, this may or may not be a problem. Nevertheless, the probability of finding (e.g. guessing) any valid key, will be a factor in determining whether a given key length has sufficiently high entropy for the desired security of the system.

In some embodiments, for example, the nature of the data accessible using the keys may be arranged such that a high probability of finding a valid key is not a problem. For example, where the keys are used to control access to multimedia such as video, a collision may provide a party with access to data portions representing a small section of a single video. This may not be seen as a problem, as that party will not have access to the remainder of the video, and thus is provided with little value (i.e. the whole video). Therefore, in such systems, the probability of collisions may be high and yet the key may still have high enough entropy. By contrast, if the data portions represent commercially sensitive data, such as financial data, then a party gaining access to even a small quantity of the data may represent a security problem, and thus the probability of collisions must be made significantly smaller for the key to have high enough entropy.

The one-way function used by the key generator 16 may be a pseudo-random number generator, as are known in the art. Alternatively the key generator 16 may be arranged to generate a random number using an unpredictable input, for example temperature or the movement of the head of a disk drive. This generates a random number—sometimes called a true random number—which is less deterministic than a pseudo-random number. Such systems are again known in the art, and use a one-way function to create values which are evenly distributed over a desired range of values. In this context, the one-way function is sometimes called a randomness extractor. In either case, while the keys will enable access to given data portions, the values taken by the keys will have no direct relationship with the data portions themselves.

In the alternative, therefore, to generate the keys, the key generator 16 may use information associated with the data portions as an input to the one-way function. This information may be associated with the data portions within the set of data portions to be associated with the key. The information may comprise at least a part of the content of the data portions, alternatively of additionally, the information may identify the data portions, for example being metadata, portion identifiers, filenames, or the like.

Where the keys are generated using information associated with the data portions, the one-way function may comprise a hash function. The hash function reduces the length of the input information to a desired length, i.e. the length of the keys. Typically the hash function will also produce an output with high uniformity meaning that the expected inputs are mapped evenly over the output range. This has the additional effect that a small change in the input will typically result in a large and unpredictable change in the output.

In embodiments, the one way function may comprise a cryptographic signing function, which may be combined with the hash function mentioned above. Where the two are combined, the hash function may be used on the information, and the hashed result signed.

The advantage of generating the keys using information associated with the data portions (for example identifying information such as metadata, or the actual content of the data portions themselves) is that the key can serve a dual purpose. That is, the key not only enables a requesting party to access the data portions, but also enables the requesting party to verify that data portions to which access is enabled are genuine. As a consequence, security is enhanced, since any changes to the data portions, between the keys being distributed and the data portions being retrieved, will be detectable.

In embodiments, all of the data may be used to generate the key, this in turn enables the validity of all of the data to be verified. However in alternative embodiments, only a part of the data may be used to generate a key—this part may be, for example, more sensitive than other parts of the data.

Where only a hash is used, the requesting party will be able to verify the integrity of the received data portions by comparing the hash of the information associated with the received data (which was used to generate the key) with the key itself. If the two match, then the received data portions may be taken as genuine, and/or the requestor has assurance that the data has not been accidentally or maliciously modified since the key was generated. To enhance security, the key may be signed. In which case the receiving party may not only determine that the data is genuine, but may confirm that the correct entity generated the key, i.e. the system offers the requester assurance of non-repudiation. The use of e.g. public/private keys to sign data and to verify data is known and will not be described in detail.

Further embodiments may use information associated with the portions, without providing any ability for verifying the integrity of the data. For example, the data itself may be used as the input to a one-way function merely to increase the unpredictability of the keys generated. In effect the information associated with the data forms the unpredictable (or at least less predictable) input in the true random number generator described above. In such cases, any number of one-way functions may be used, so that an evenly distributed output is produced.

In some embodiments, it may be desirable to have each given set of data portions associated with only a single key. Thus, if two requesting parties are to be allowed access to that set of data portions, they will receive the same key. This may be desirable in a system where keys are intended to be shared between requesting parties, and enables the number of keys to be kept low.

However, in the alternative, it may be desirable to provide each requesting party with different keys, irrespective of what data portions are to be accessed using those keys. In such embodiments an additional value, sometimes called a salt value, may be included as an input into the one-way function. This enables two different keys to be created for the same set of data portions. Since the keys are different, the requesting party making the request can be identified, meaning that if an unauthorized request is made using a valid key, the authorized requesting party from which the key was obtained can be identified.

If the keys are to be used to validate the data portions (see above) and are generated using salt values, the requesting parties may need to know the relevant salt values (e.g. if integrity checks on the data are required)—otherwise the requesting party will be unable to generate a valid hash. In this case the salt values may be made available with the keys, for example, the salt values and the keys may be distributed together. In other embodiments, the salt values may be made publically available in a lookup table.

Alternatively, a pre-shared secret value or values may be specific to a given requesting party—in other words, a prior arrangement ensures that the requesting party knows what pre-shared secret value or values are to be used (may be in a similar manner as a salt value).

In yet further embodiments, the salt values may be stored with the data portions, for example by creating additional data portions representing the salt values. In the following example, two different keys (here K1a and K1b), access the same set portions of the original data, portions P2, P3 and P6. However in each case, the portions of data are augmented with salt value portions, Pa and Pb. As a consequence, the keys generated using the data portions are different. This is summarized in the table below. It will be understood that the validation of the received data is possible without modification as the received portions will include a salt values Pa or Pb.

| Key | Salt Value | Portions |
|-----|------------|----------|
| K1a | Pa | P2, P3, P6, Pa |
| K1b | Pb | P2, P3, P6, Pb |

As mentioned above, the keys may be distributed via first network 22, while the access requests, and the portions of data sent in response, may be transmitted through a second network 26. This provides the advantage that the first network 22, used to distribute the keys, may be provided with a higher level of security in comparison to the second network 26. In some embodiments, the first network 22 may be replaced by an alternative method of providing the keys—for example physical transportation of the keys on a physical media. Either way, the keys may be kept relatively secure, while the access to the data portions is enabled using a relatively less secure network. In embodiments either or both of the first and second networks 22 and 26 may be cryptographically protected using e.g. SSL or TLS.

A further advantage is that embodiments facilitate access to data using an existing, or legacy, protocol, when that existing protocol is constrained in terms of the amount of data that can be transmitted, and it is inconvenient or expensive to modify the protocol. For example, the first network described above may support such a first protocol. The keys, which are relatively small in terms of number of bytes, may be distributed using this first protocol, while the data portions may be transmitted via a second protocol, which is unconstrained in terms of type and amount of data that can be transmitted. This ensures backward compatibility, as devices can still access the data portions—via the keys that are transmitted over the first protocol.

It will be appreciated that the keys and associated sets of portions may be stored in a number of formats within the first database 14 and second database 18. For example, in one embodiment, the keys may be directly associated with portions as follows. Thus information explicitly identifying the sets does not need to be stored.

| Key | Portions |
|-----|----------|
| K1 | P2 |
| K1 | P3 |
| K1 | P6 |
| K2 | P1 |
| K2 | P2 |
| K2 | P3 |
| K2 | P4 |
| K2 | P5 |
| K2 | P7 |

In other embodiments, a relational database structure may be used, for example a first table may associate keys with sets:

| Key | Set |
|-----|-----|
| K1 | S1 |
| K2 | S2 | and a second table may associate sets with portions:

| Set | Portions |
|-----|----------|
| S1 | P2, P3, P6 |
| S2 | P1-P5, P7 |

This latter structure provides the advantage that only a single field in a single table needs to be modified if a key is compromised or needs to be revoked. Equally when a new key is issued, only a single record needs to be updated. In some embodiments, the second table, associating the sets with data portions may be stored with the data portions themselves, i.e. in the first database 14. In such cases, the responses from the second database in steps 114 and 126 above may contain an identification of a set, if a key is valid, and the requests in steps 116 and 128 may be for a given set of data.

While in the above method, a given request resulted in the provision of all data portions associated with the key provided in the request, some embodiments may allow the requesting parties to identify portions when making a request. Therefore, for example, in step 110, the requesting party 24A may provide key K1, and request only portion P2. As a result, in step 120, the access controller 20 may provide only data portion P2 to the requesting party 24A.

Figure 3:
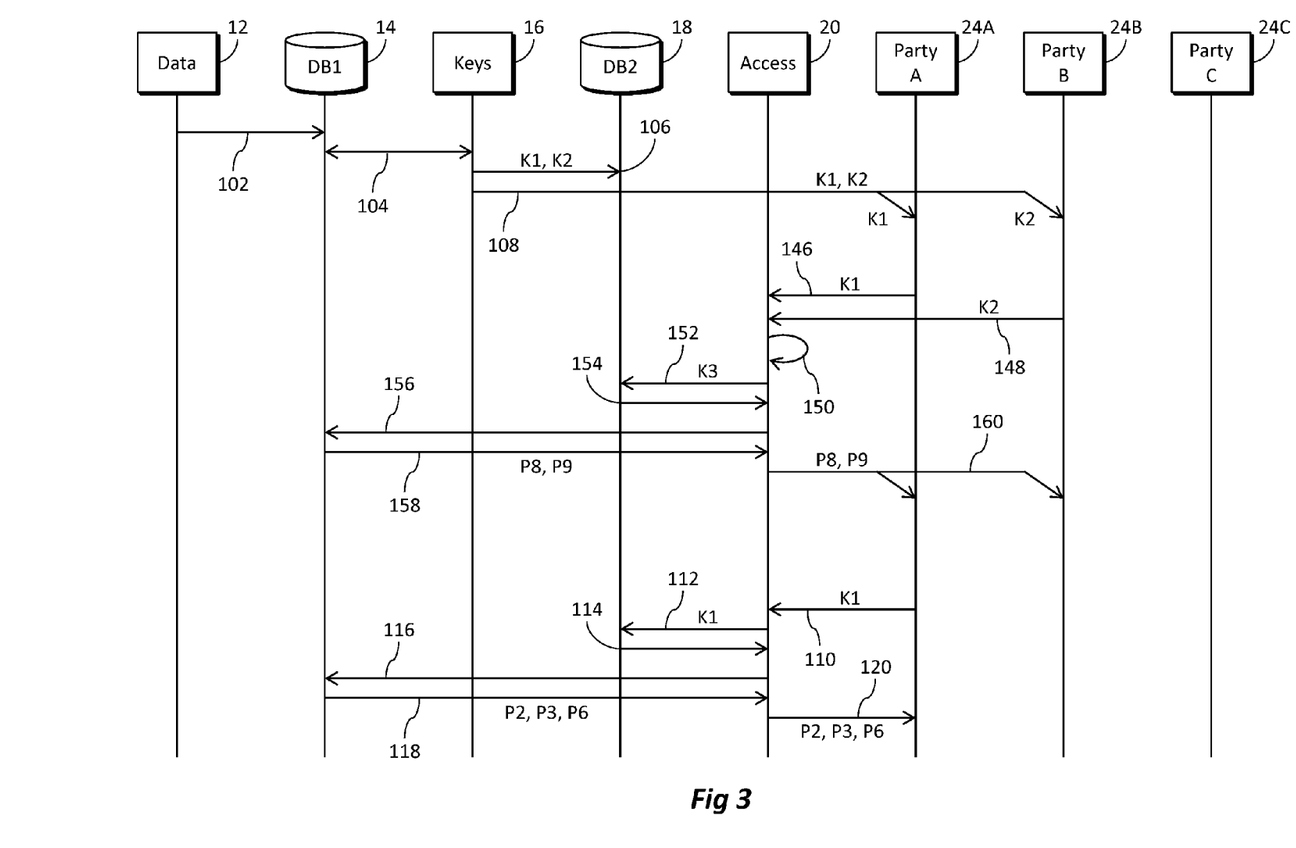
FIG. 3 illustrates a further method utilizing combined keys according to an embodiment.
Figure 4:
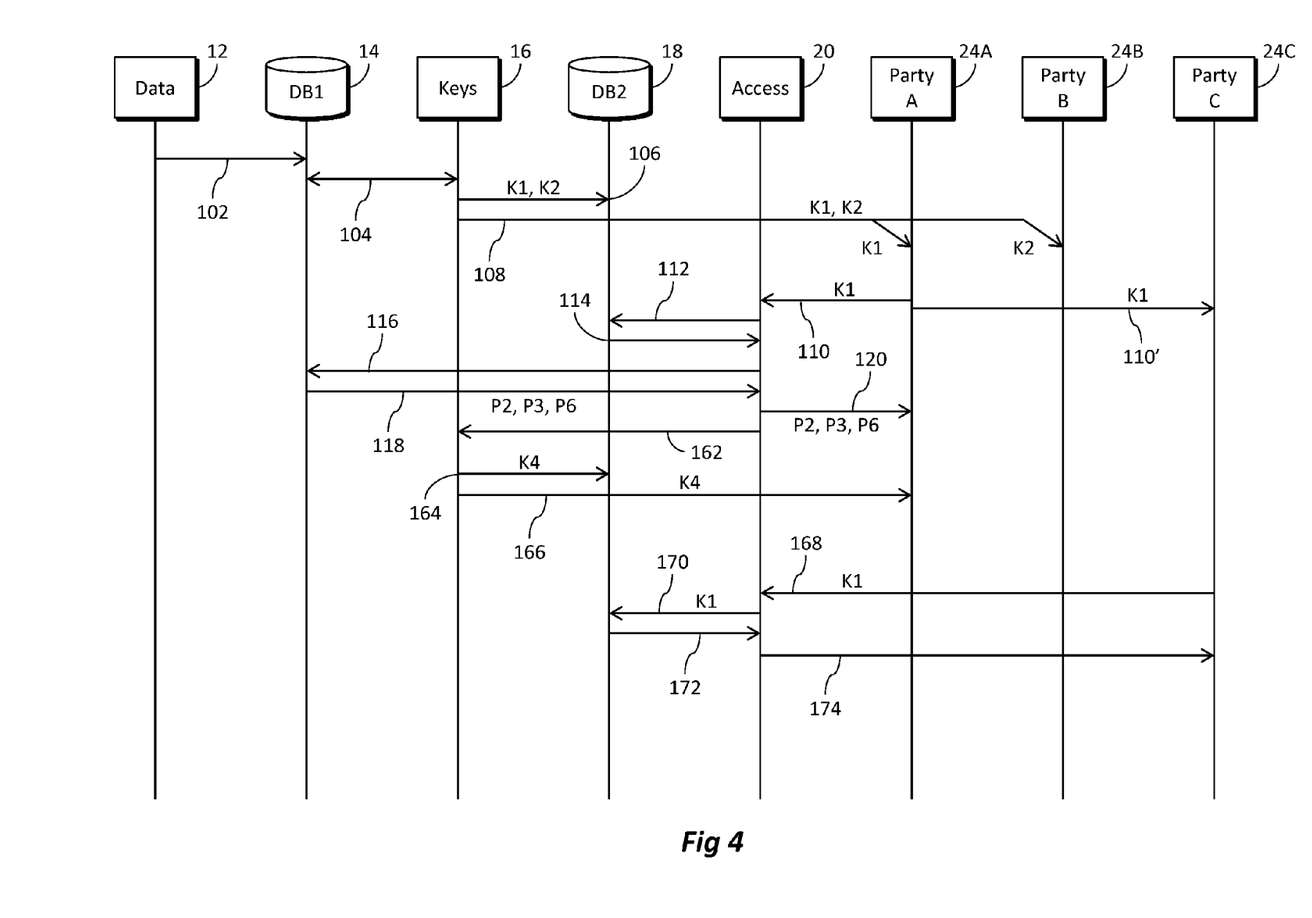
FIG. 4 illustrates a method according to an embodiment in which a key can be used a limited number of times.
Figure 5:
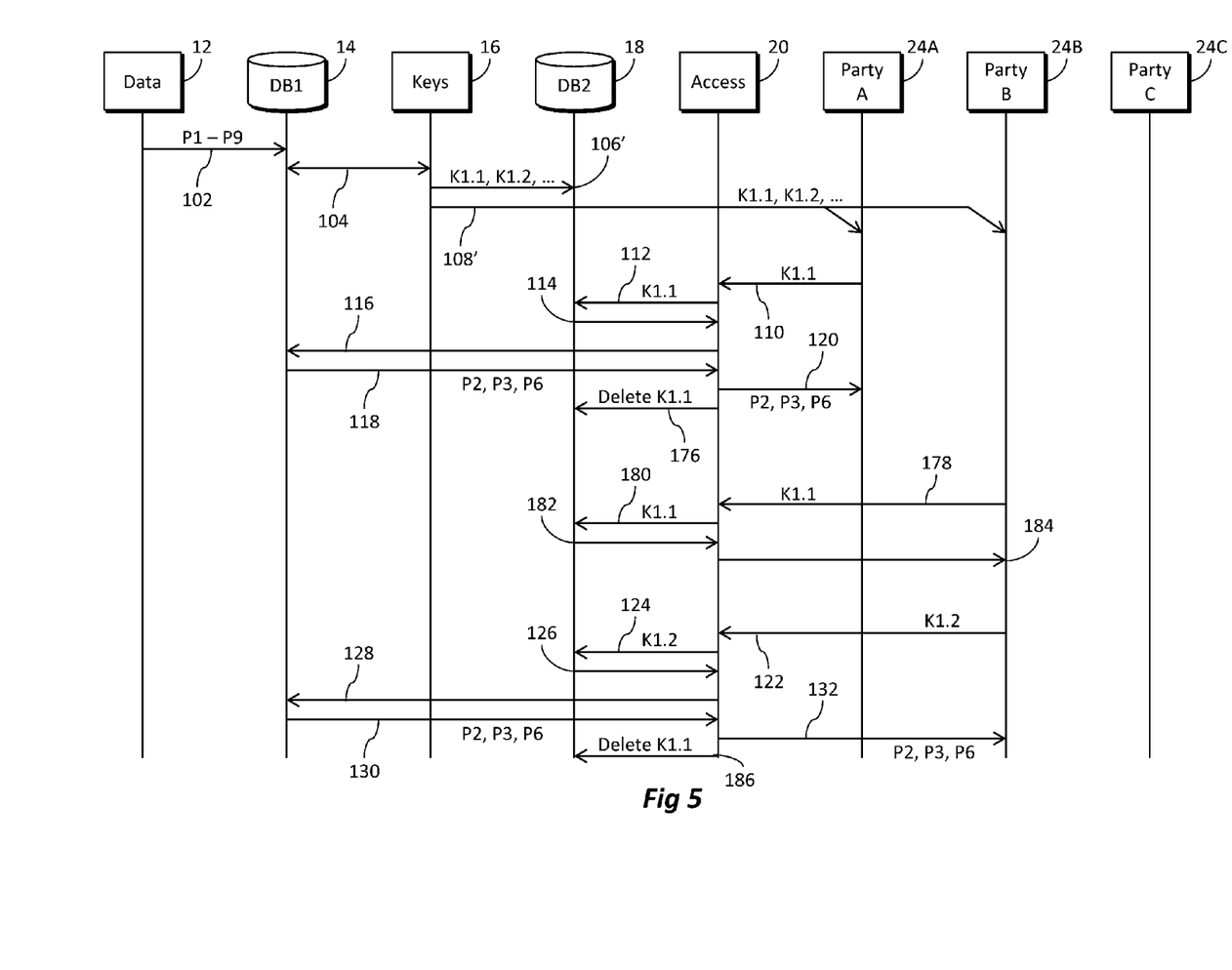
FIG. 5 illustrates a further method according to an embodiment in which multiple keys are generated, each being useable a limited number of times.

While FIG. 2 shows a first method of enabling access to data using keys, FIGS. 3 to 5 will be used to illustrate variations which may be incorporated into, or substituted for, the method described above.

FIG. 3 illustrates a method which utilizing combined keys. This method will be described in detail below, but in overview the method enables certain portions to be access only by two or more parties acting together. This increases security for more sensitive data as both parties are required to provide their keys to enable access.

Steps 102 to 108, the generation of sets of data portions and association with keys progresses in a similar manner to that described above. However in this case three keys may be created as follows:

| Key | Set | Portions |
|-----|-----|----------|
| K1 | S1 | P2, P3, P6 |
| K2 | S2 | P1-P5, P7 |
| K3 | S3 | P8, P9 |

The third key, K3 is based on a combination of the first and second keys. The third key may be generated, for example, as a function of the first and second keys such as a concatenation or a bitwise exclusive-or (XOR) of the first and second keys. It will be appreciated that other functions, including one-way functions, may be used. Alternatively, the third key may be generated, and then itself used to generate the first and second keys—for example by splitting the third key into parts, or by calculating the first and second keys using the third. Whichever method is used, the third key can be derived from knowledge of the first and second keys.

As shown above, the third key is associated with a third set S3 which identifies portions P8 and P9. In this example the first and second keys K1 and K2 are associated with sets S1 and S2 respectively; however this is not a requirement, and one or both of the first and second keys K1 and K2 may not be associated with any set of data portions. In effect, while the third key provides access to a particular set of data portions, it does not have to be distributed to recipients. Instead it represents a particular combination of other keys; these other keys are distributed to recipients and these keys are required by the access controller 20 for the access controller 20 to return data portions relating to this third key. In this regard the first and second keys can be considered to function as surrogates for access to a particular data set associated with the third key.

Accordingly, the first and second keys are made available for distribution in step 108. Specifically, in this example, key K1 is made available to requesting party 24A, and key K2 is made available to requesting party 24B. The third key is not distributed, which is to say that no requesting party will receive the third key.

Following the distribution of the first and second keys in step 108, the requesting parties 24A and 24B cooperate to combine the keys and to request access using the combined keys. One method of doing this is shown in FIG. 3. In this example, it will be assumed that the access controller 20 has identified that access will be requested using multiple keys. This may be in response to one of the parties indicating that a multi-key request is being made in a given request, or by the request identifying data portions which can only be accessed using multiple keys.

Accordingly, in step 146 the requesting party 24A sends a request comprising the key K1 to the access controller 20. In addition, in step 148 the requesting party 24B also sends a request, this one comprising the key K2, to the access controller 20. Having received both keys, the access controller may, in step 150, generate the third key K3 using the first and second keys K1 and K2. This third key K3 is then sent to the second database 18 in an analogous step to steps 112 and 124 above. As there is a set of data (set S3) associated with the key K3, the access controller in step 154 receives data identifying the set S3 or the portions thereof (portions P8 and P9) from the second database 18. The access controller in step 156 then retrieves the portions P8 and P9 from the first database 14, and provides the portions to one or both of the requesting parties 24A and 24B. Therefore, only by combining the keys can the two requesting parties gain access to the portions P8 and P9.

In addition to combining the keys, the requesting parties may act independently and retrieve any portions which are associated with the individual keys distributed to the parties. This is shown in FIG. 3 in steps 110 to 120 which are the same as steps 110 to 120 above, and show the first requesting party 24A accessing portions P2, P3 and P6 using the key K1. As mentioned above, the keys K1 and K2 do not have to be associated with any sets of data portions. Accordingly, in an alternative embodiment, a request using key K1 may result in a rejection as for an invalid key, described in steps 134 to 140 above.

Thus embodiments provide an efficient system for enabling selective access to portions of data not only to individual parties, but to parties acting together. To coordinate the actions of the two parties, a key may be requested from one or other of the requesting parties by the access controller 20. For example, a first requesting party, e.g. requesting party 24A, may request access to data and identify that the requesting party 24B is also required to provide a key. As a consequence, the access controller 20 may communicate with requesting party 24B to request the key K2. Alternatively, the requesting party 24A may request access to e.g. portions P8 and/or P9, and the access controller may store data enabling it to contact the second requesting party 24B to request the appropriate key. Other methods of communicating between the parties so that both provide keys will be evident to the skilled person.

Therefore, a second requesting party (e.g. party 24B) may be provided with the ability to allow or refuse access for a first party (or vice versa). Thus embodiments may be used in a scenario where one user controls access to data for at least one other user. In practice, the second requesting party may be an administrator who has the ability to grant or refuse access for any one of a number of member parties. In such embodiments, a single administrative key may grant access to different sets of data portions when combined with different member keys. Thus a member key may be considered as an identifier of a given set of data portions, and the administrator key an access control key for those data portions.

In some embodiments, the function used to combine the keys may be arranged such that, even though the requesting parties 24A and 24B have knowledge of the individual keys K1 and K2, these parties will be unable to generate the key K3 if they are only in receipt of one key. This level of control may be enforced by using a function such as a one-way function within the access controller 20 to generate the key K3. This has the advantage that two parties need to provide the keys K1 and K2 individually to the access controller 20 to gain access to the data portions P8 and P9.

In the alternative, the key K3 may be a calculated combination of keys K1 and K2. In such embodiments, one or both of the requesting parties 24A and 24B may receive a key from the other. The requesting party that receives a key from another party may then combine the keys to produce the key K3, which is used in a request for access to data. That party will then be able to access the data portions P8 and P9 as if that party had been originally provided with the key K3 in the distribution. Such embodiments provide the advantage that only a single access request, using what amounts to key K3, is required to access data, and avoids the access controller 20 making a request to another party for a key. It will be appreciated that the system used may be tailored in dependence on the intended purpose of the system.

While the above embodiments have been described in terms of a key K3 being associated with data portions, it will be appreciated that the access controller 20 and second database 18 may be arranged such that an access request or requests comprising multiple keys may lead to access being granted without actually requiring determination of an intermediary key, i.e. key K3. This has the advantage that the number of keys is reduced; however, the use of a determined key, such as key K3, provides the advantage that the arrangement of the database 18 is simplified, since the database 18 will not have to store any additional information indicating that multiple keys are required.

In some embodiments, the keys to be combined may be sent to different requesting parties. However this is not a requirement, and the keys may be sent to a single requesting party. The keys may be sent using different communications systems—e.g. one key is sent via a SMS, the other via email—or at different points in time. Thus embodiments can be used to enable access to a party in more complex scenarios.

In some embodiments, keys may only be used a limited number of times. Two examples of such embodiments are described in FIGS. 4 and 5. In both examples, a given key may be used only once; however this is not a requirement, and a given key may be used multiple times, albeit still a limited number of times.

A first example is shown in FIG. 4. As before in steps 102 to 108, the portions are stored in the first database 14 and the keys are distributed. As with the method described above, the requesting party 24C does not receive a key. However, in the scenario of this embodiment, the requesting party 24C has compromised the system of requesting party 24A. As such, the requesting party 24C is able to acquire a copy of the key K1 when it is used by the requesting party 24A. This is shown in steps 110 and 110'. In step 110, as with step 110 above, the requesting party 24A sends a request, comprising the key K1, to the access controller 20. However, in addition, the key K1 is received, in step 110' by the requesting party 24C.

Steps 112 to 120 follow the steps of the same number described above, and result in the requesting party 24A being able to access the portions P2, P3 and P6. However, following the granting of access to these portions, the access controller sends a message to the key generator 16 informing the key generator 16 that the key K1 has been used. This is shown as step 162. In response to the message in steps 162, the key generator generates a new key to be associated with the set S1. In step 164 the second database 18 is updated to reflect that the key K4 now associated with the set S1, and thus with portions P2, P3 and P6. The key K1 is revoked and may be removed from, or suppressed within, the second database 18. In addition, the key generator 16 makes the new key K4 available for distribution to the requesting party 24A, as shown by step 166. In effect, key K1 is replaced by key K4. The key K4 may be generated using e.g. a different salt value to key K1, as was described above. If the salt value is to be stored with the data, i.e. as a portion (e.g. Pa and Pb) then the data may be modified to contain the new salt value.

In some embodiments, the new key K4 may be generated prior to the accessing of the data portions by the requesting party 24A. The new key may consequently be made available to the requesting party along with the data portions. In other words, steps 120 and 166 may be combined.

As described above, in the meantime (step 110'), the requesting party 24C has gained access to the key K1. The requesting party 24C therefore attempts to use this key to access the data by sending a request, comprising the key K1, to the access controller in step 168. As with steps 136 to 140 above for key K#, the key K1 is not valid, and consequently the request is rejected.

Thus, the method above may be used to improve the security of the system, and reduce the opportunity for attacking parties to gain access to the stored data using intercepted or stolen keys.

The replacement of keys may be used in combination with the system described above where multiple keys are required for access to certain sets of data portions to replace a used key. In embodiments, only a subset of the keys used for a multi-key request may be replaced. For example, in the embodiment above, each request may result in the administrator key being replaced, but not in the user key being replaced.

A further method, in which keys are only used once, is shown in FIG. 5. This method differs from that shown in FIG. 4 in that a plurality of keys, each associated with a single set, are generated initially and distributed together. This is represented by steps 106' and 108', where keys K1.1, K1.2, . . . K1.N are all associated with set S1 and are distributed to the requesting parties 24A and 24B. Each of the keys K1.1 to K1.N may be generated using a different salt value.

In steps 110 to 120, as with the same numbered steps above, the key K1.1 is used by the requesting party 24A to request access to the data portions associated with that key, i.e. the data portions in set S1. As before, access to these data portions is granted in step 120. However, following step 120, the access controller 20, in step 176, sends a message to the second database 18 to revoke, delete or suppress the key K1.1 as it has now been used.

Subsequently, in step 178, a further attempt is made to request the data portions in set S1 corresponding to the keys K1.1, K1.2 etc. In this example, both requesting parties 24A and 24B have been provided with the same set of keys. Moreover, requesting party 24B is unaware that the key K1.1 has been used. Therefore in step 178 the requesting party 24B requests access to the data using the key 1.1. However, since the key K1.1 is no longer valid, this request is handled in a similar manner to the request described in steps 134 to 140 above, and is rejected. It will be appreciated that this would be how any further request using the key K1.1 would be handled—i.e. if the request had come from requesting party 24C who had gained the key K1.1 by intercepting it from requesting party 24A as described in step 110' above.

However, since the requesting party 24B has knowledge of a plurality of suitable keys, i.e. keys K1.2 etc., the requesting party 24B may make a further request using a further suitable key. This is shown in step 122, where the key K1.2 is used in a request. This request is effectively handled as per original request 122 above; steps 122 to 132 follow, with access being enabled for the portions of data associated with the key K1.2. As per step 176 above, step 132 may be followed by the key K1.2 being deleted or suppressed in the second database 18, as shown by step 186.

While the above only describes two keys being used, any number of keys may be issued, and any party may have to make request using a much larger number of keys before one is accepted. It will be understood that any given requesting party may keep a record of keys which have been used. Therefore, for example, should the requesting party 24A make a further request for the data, it would make a first attempt with key K1.2, as it will know that key K1.1 has been used already. It will be appreciated that this request would be rejected, as the key K1.2 has been used by requesting party 24B, and therefore the requesting party would have to use a key K1.3 etc. until a request is granted.

While the above embodiment is described in terms of two parties being provided with the same keys, in other embodiments the parties may be provided with different keys, yet still be allowed access to the same set of data using those keys. This avoids one party being denied access based on the other party using a given key.

Alternative Details and Modifications

While the embodiments above have been described separately, it will be appreciated that features from one may be combined with features from another. For instance the combined key embodiment, shown in FIG. 3 may be combined with a mechanism for using keys only once, as described in e.g. FIG. 4.

Embodiments described above may be combined with other forms of access control, for example authentication using a username and password, to increase the security of the system as a whole. In such cases, a key may be associated with a username, and thus access will only be granted to an authorized user who is in possession of a key associated with that user.

In the embodiments described above in FIGS. 2 to 4, a single key is provided at a time to a given requesting party. However in other embodiments, a single key may be provided to multiple parties. Alternatively or additionally, multiple keys may be associated with a single set, the key being provided to multiple requesting parties. This enables the parties to access the same data, but for a log to be maintained over which party has made a given access request.

In the multi-key embodiment described with reference to FIG. 3, a given portion of data may be accessible using different combinations of keys. As a consequence, a first requesting party may request access to data using a first key. In response the access controller may request a second key from one of a plurality of second requesting parties. A response (containing a key) from any one of the second requesting parties will grant the first party access to the data. Thus the keys may be used as a method to confirm an access request.

In FIGS. 4 and 5 the keys are described as being usable a limited number of times. However this may not be the only reason that a key is revoked, deleted or suppressed. For instance, a key may have a validity for only a certain period of time, after which it is revoked, and a replacement distributed. In embodiments, time based revocation may be combined with limited use revocation, meaning that once a key is used once, it is valid for a given period of time, during which it may be used any number of times, and after which it is revoked.

While the above has generally been described with a limited number of keys, typically two, embodiments are applicable to a system utilizing a larger number of keys. This may enable access to be controlled for a large number of sets, or for a large number of parties. Furthermore, more than two keys may need to be combined for the combined access described in relation to FIG. 3.

The access system 10, or the nodes or elements 12 to 20, may comprise computerized hardware as is known in the art. For completeness, an exemplary computerized system 50, capable of performing the method steps described above, will now be described with reference to FIG. 6. This computerized system may be used to perform the function of the access system 10 as a whole, or a number of the computerized systems 50 may be used, each performing the function of one or more of the nodes 12 to 20 described above.

Figure 6:
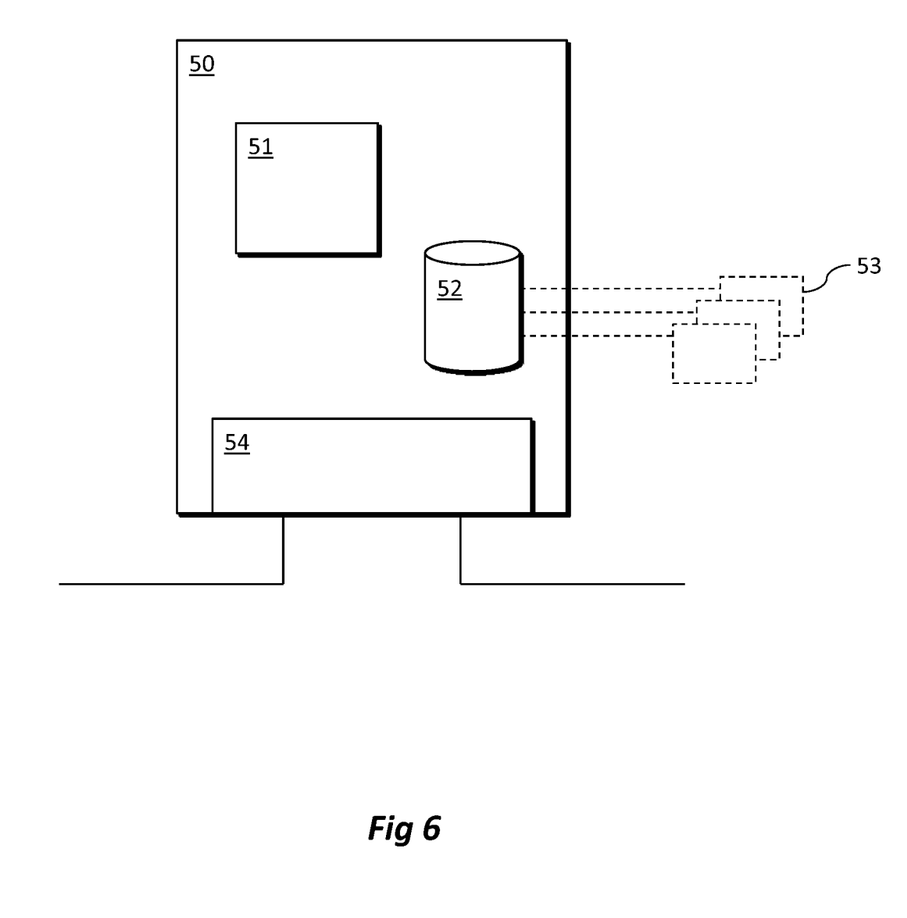
FIG. 6 shows a schematic diagram of a network node which may be used in embodiments of the invention.

The computerized system 50 comprises a processing system 51, such as a CPU, or an array of CPUs. The processing system 51 is connected to a memory 52, such as volatile memory (e.g. RAM) or non-volatile memory, for example a solid state (SSD) memory or hard disk drive memory. The memory 52 stores computer readable instructions 53. The system 50 may also comprise an interface 54, capable of transmitting and/or receiving data from other network nodes.

In use the processing system 51 may retrieve the computer instructions 53 from memory 52 and execute these instructions whereby to perform the steps described above. In so doing, the processing system 51 may cause the interface to transmit or receive data as required. This data may itself be stored in memory 52, and retrieved as required—for example to be transmitted via the interface.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. A method of enabling access to data, the method comprising:
   generating a plurality of sets of data, each set of data identifying one or more data portions and at least one data portion being identified in two or more sets of data;
   using a one-way function to generate a plurality of keys each associated with a respective one of the plurality of sets, wherein information associated with a particular set of data from said plurality sets of data is used as an input to the one-way function when generating a key associated with the particular set, wherein generating the key associated with the particular set includes generating first, second and third keys, the third key being related to a combination of at least the first and second keys, and associating the third key with the particular set;
   arranging for the keys including the first and second keys to be available for distribution to one or more requesting parties, wherein the distribution of the keys is controlled to restrict access to the plurality of sets of data;
   receiving a data access request comprising at least one key from a requesting party; and
   enabling access to data in the particular set for the requesting party, based on the received key, wherein access to the particular set is granted in dependence on receipt of either a combination of the first and second keys or the third key.

2. The method of claim 1, wherein the information associated with a set of data identifies the content of the set of data.

3. The method of claim 1, wherein the information associated with a set of data comprises at least a part of the content of the set of data.

4. The method of claim 1, comprising using one or more salt values as inputs to the one-way function.

5. The method of claim 4, comprising storing a salt value used to generate a given key as data in a set accessible using the given key.

6. The method of claim 1, wherein the one-way function comprises one or more of:
   a hash function;
   a cryptographic signing function;
   a random number generator; and
   a pseudo-random number generator.

7. The method of claim 1, wherein the keys have high entropy.

8. The method of claim 1, wherein access is enabled for a limited number of requests comprising a given key.

9. The method of claim 8 comprising generating a plurality of keys associated with a given set.

10. The method of claim 8, comprising generating a second key associated with a given set in response to receiving a request comprising a first key associated with a given set.

11. The method of claim 1, comprising:
   associating a plurality of keys with a said set;
   arranging for the plurality of keys to be available for distribution; and
   enabling access to the said set of data in dependence on a predetermined criterion being satisfied, said predetermined criterion being dependent on receipt of two or more of the plurality of keys.

12. The method of claim 1, comprising associating the first and second keys with respective further sets.

13. The method of claim 1, comprising storing the keys and information identifying the sets in a lookup table.

14. The method of claim 13, comprising identifying data in a set associated with the received key in the lookup table.

15. The method of claim 1, comprising transmitting the keys using a first protocol whereby to make the keys available for distribution, and wherein at least a part of the data in a set is suitable for communication via a second, different, protocol.

16. The method of claim 15, comprising enabling access to the data using a second protocol.

17. Apparatus for enabling access to data, the apparatus configured to:
   generate a plurality of sets of data, each set identifying one or more data portions and at least one data portion being identified in two or more sets;
   use a one-way function to generate a plurality of keys each associated with a respective one of the plurality of sets, wherein information associated with a particular set of data from said plurality sets of data is used as an input to the one-way function when generating a key associated with the particular set, wherein generating the key associated with the particular set includes generating first, second and third keys, the third key being related to a combination of at least the first and second keys, and associating the third key with the particular set;
   arrange for the keys including the first and second keys to be available for distribution to one or more requesting parties, wherein the distribution of the keys is controlled to restrict access to the plurality of sets of data;
   receive a data access request comprising at least one key from a requesting party; and
   enable access to data in the particular set for the requesting party, based on the received key, wherein access to the particular set is granted in dependence on receipt of either a combination of the first and second keys or the third key.

18. A non-transitory computer-readable medium comprising computer-executable instructions which, when executed by a processor, cause a computing device to perform a method of enabling access to data, the method comprising:
   generating a plurality of sets of data, each set identifying one or more data portions and at least one data portion being identified in two or more sets;
   using a one-way function to generate a plurality of keys each associated with a respective one of the plurality of sets, wherein information associated with a particular set of data from said plurality sets of data is used as an input to the one-way function when generating a key associated with the particular set, wherein generating the key associated with the particular set includes generating first, second and third keys, the third key being related to a combination of at least the first and second keys, and associating the third key with the particular set;
   arranging for the keys including the first and second keys to be available for distribution to one or more requesting parties, wherein the distribution of the keys is controlled to restrict access to the plurality of sets of data;
   receiving a data access request comprising at least one key from a said requesting party; and
   enabling access-to data in the particular set for the requesting party, based on the received key, wherein access to the particular set is granted in dependence on receipt of either a combination of the first and second keys or the third key.

19. The method of claim 1, further comprising:
   receiving a second data access request comprising said key in the data access request, the second data access request being received from an unauthorized requester to request access to the data in said set; and
   refusing the unauthorized requester from accessing the data in said set.

20. The method of claim 1, wherein the plurality of keys includes at least two different keys that are generated for different requesting parties for the same set of data.

* * * * *

UNITED STATES PATENT AND TRADEMARK OFFICE
CERTIFICATE OF CORRECTION

PATENT NO. : 10,133,872 B2
APPLICATION NO. : 15/047496
DATED : November 20, 2018
INVENTOR(S) : Boris Taratine and Malcolm Lewis Page 1 of 1

It is certified that error appears in the above-identified patent and that said Letters Patent is hereby corrected as shown below:

In the Claims

Column 20, Claim 18, Line 38 please remove "from a said requesting party" and insert -- from a requesting party --

Signed and Sealed this
Fifth Day of March, 2019

Andrei Iancu
*Director of the United States Patent and Trademark Office*